United States Patent [19]

Yamauchi et al.

[11] Patent Number: 4,690,960

[45] Date of Patent: Sep. 1, 1987

[54] VIBRATION DAMPING MATERIAL

[75] Inventors: Fumio Yamauchi, Tokyo; Tsutomu Tohara, Kanagawa; Shigeo Nakano; Shigeo Emoto, both of Tokyo, all of Japan

[73] Assignee: Nippon Electric Co., Ltd., Tokyo, Japan

[21] Appl. No.: 691,354

[22] Filed: Jan. 14, 1985

Related U.S. Application Data

[63] Continuation of Ser. No. 467,042, Feb. 16, 1983, abandoned.

[30] Foreign Application Priority Data

| Jan. 14, 1981 | [JP] | Japan | 56-4266 |
| Mar. 26, 1981 | [JP] | Japan | 56-44590 |
| Apr. 10, 1981 | [JP] | Japan | 56-54043 |
| Apr. 28, 1981 | [JP] | Japan | 56-64737 |
| Jan. 22, 1982 | [JP] | Japan | 57-7168 |
| Feb. 16, 1982 | [JP] | Japan | 57-23222 |
| Mar. 4, 1982 | [JP] | Japan | 57-30556[U] |

[51] Int. Cl.$^4$ .................. B23P 11/00; F16M 11/00; C08K 3/22
[52] U.S. Cl. .................. 523/442; 523/458; 523/513; 523/515; 29/436; 248/562; 248/638; 524/431
[58] Field of Search .............. 523/442, 458, 513, 515; 524/437

[56] References Cited

U.S. PATENT DOCUMENTS

| 2,427,942 | 9/1947 | Bulifant | 524/431 |
| 3,148,082 | 9/1964 | Ricco et al. | 524/431 |
| 3,268,199 | 8/1966 | Kordyban et al. | 248/562 |
| 3,406,105 | 10/1968 | Letendre | 523/515 |
| 3,489,242 | 1/1970 | Gladding et al. | 181/208 |
| 3,867,299 | 2/1975 | Rohatgi | 524/431 |
| 3,904,456 | 9/1975 | Schwartz | 252/62 |
| 3,976,613 | 8/1976 | Schinabeck | 523/442 |
| 4,305,172 | 12/1981 | Watson | 248/638 |
| 4,378,463 | 3/1983 | Senior et al. | 524/431 |
| 4,391,857 | 7/1983 | Saito et al. | 524/446 |
| 4,595,515 | 6/1986 | Wakino et al. | 252/500 |

FOREIGN PATENT DOCUMENTS 55-104339 8/1980 Japan .................. 524/431

*Primary Examiner*—Lewis T. Jacobs
*Attorney, Agent, or Firm*—Sughrue, Mion, Zinn, Macpeak & Seas

[57] ABSTRACT

A vibration damping material having an improved mechanical strength and excellent vibration damping characteristic is disclosed.

The material is made by usage of composition of 40 to 90 weight percent of iron oxide particles 0.1 to 100 μm in size and 60 to 10 weight percent of resin.

8 Claims, 15 Drawing Figures

VIBRATION DAMPING MATERIAL

This is a continuation of application Ser. No. 467,042 filed 2-16-83, now abandoned.

BACKGROUND OF THE INVENTION

This invention relates to a vibration damping material which is used for absorbing or isolating vibration, and particularly to a material for vibration-proof bed or base on which a precision working equipment or a precision measuring equipment is mounted for preventing external vibration or vibration arising from a power source incidental to the equipment from being transferred to a working unit or a measuring unit.

When machine tools such as NC lathes and grinding machines which are used for precision machining in micron or sub-micron order, precision working equipment like a photo repeater which is used for manufacturing semiconductor devices, and precision measuring equipment like a microscope are exposed to vibration, they are impeded in their intrinsic characteristics to bring ihto full play. Therefore, they are mounted usually on a bed having a function to absorb or isolate vibration.

The bed intended for such purpose has been constituted hitherto of steel, cast iron or rubber.

With a large rigidity, the bed constituted of steel or cast iron as above can hardly give rise to deformation like flexure when devices of large mass are installed thereon. However, such bed is not large in damping function of vibration and is insufficient in isolation characteristic of an infinitesimal vibration coming externally. Furthermore, such bed of iron group is so heavy itself that place of installation and transportation thereof are naturally restricted to inconvenience.

On the other hand, where the bed is constituted of an elastic material like rubber, a large vibration damping characteristic is obtainable, however, since rigidity is small, the bed is largely deformed itself, and thus is not suitable for having devices of large mass mounted thereon.

In view of the situation above, the inventors of this application proposed a vibration-proof bed formed with a new composite material at 1981 National Convention for Semiconductor Material Department, Institute of Electronics and Communication Engineers of Japan. The proposed new composite material used for the bed was obtained by making fine grains of iron oxide hardened with resin, and it was reported that a logarithmic decrement about 100 times superior to iron and aluminum was realized by means of the composite material containing ferrite particles of 0.05 to $0.1\mu$ in size and polyester resin respectively at 90% by weight and 10% by weight. Further the composite material is lightweight to have a density one thirds or so of iron, and hence easy to transport and install. However, a mechanical strength of the composite material is $10^6$ N/m² in order, which is inferior as compared with iron. Therefore its application was restricted more or less consequently.

An object of this invention is to provide a vibration damping material having a superior damping characteristic and an improved mechanical strength.

Another object of this invention is to provide a material for vibration-proof bed which is free from deviation in characteristic and high in practicability.

SUMMARY OF THE INVENTION vibration damping material according to the present invention is obtainable through dispersing 40 to 90% by weight of iron oxide particles with averaged particle size of 0.1 $\mu$m to 100 $\mu$m in the remaining portion, i.e. 60 to 10% by weight of resin and then hardening. There may be a case where iron oxide paritcles coming outside the above range for particle size are mixed in distribution, however, the effect will not be impaired in this invention subject to 50% or more of the particles working therefor coming in the range 0.1 to 100 $\mu$m. For the above iron oxide, the so-called magnetite having a chemical formula $Fe_3O_4$ or ferrite expressed by a chemical formula $M_xFe_{1-x}^{3+}O_4$ (M being a heavy metal such as Cr, Mn or Zn) can be utilized effectively. Particularly in the present invention, ferrite fine grains produced by a process for treating waste water including a heavy metal or metals can be advantageously utilized. The outline of such process is as follows.

Ferrous ions are added to the waste water. Then, alkali substance with amount of about one equivalent of a total acid radical in the waste water is added to the waste water. Then, the above ferrous ions are oxidized, and thus the above heavy metal or metals are incorporated in a crystal lattice of precipitated ferrite crystal. Here, the ferrite fine particles produced as above are small in size as 0.05 to 0.1 $\mu$m when produced through a short-time reaction, however, the particles produced through a long time reaction can be made easily to a size of 0.1 to 100 $\mu$m according to crystalline growth. This process is described in detail in the U.S. Pat. No. 3,931,007.

As the above resin, polyester, polypropylene, urethane, phenol, epoxy ABS resin, rubber etc. can be utilized.

In the present invention, iron oxide particles with averaged particle size of 1 to 100 $\mu$m are favorably used and an amount of such particles is favorably in the range of 70 to 90% by weight. According to the above feature, further improved characteristics in damping of vibration and mechanical strength can be obtained.

According to the present invention, the iron oxide particles of 0.1 to 100 $\mu$m in size can be dispersed easily and uniformly in the resin without cohering partly, therefore a deviation-free and uniform vibration damping material is obtainable.

On the other hand, the above particle size of iron oxide is available for the ferrite grains themselves contributing to an increase in strength as filler. Therefore a mechanical strength ($10^7$ to $10^8$ N/m²) about 30 to 100 times as large as that of the vibration damping material proposed as hereinabove can be materialized.

Then, the iron oxide particles having size larger than 100 $\mu$m are not preferable, because a dispersiveness of the iron oxide in the resin is impaired and a vibration damping characteristic also deteriorates.

DETAILED DESCRIPTION OF THE INVENTION

The vibration-proof bed or base for microscope, surface roughness tester, hardness tester, etc. has been constituted normally of a rigid pedestal of cast iron or aluminum and a coil spring and an air spring supporting the pedestal. The vibration-proof bed is then designed so as to minimize vibration transmissibility T given by the following expression for isolating external vibrations.

$$T = \frac{\sqrt{1 + \left(\frac{2\epsilon}{\omega_0}\right)^2 \left(\frac{\omega}{\omega_0}\right)^2}}{\sqrt{\left\{1 - \left(\frac{\omega}{\omega_0}\right)^2\right\}^2 + \left(\frac{2\epsilon}{\omega_0}\right)^2 \left(\frac{\omega}{\omega_0}\right)^2}}$$

Figure 1:
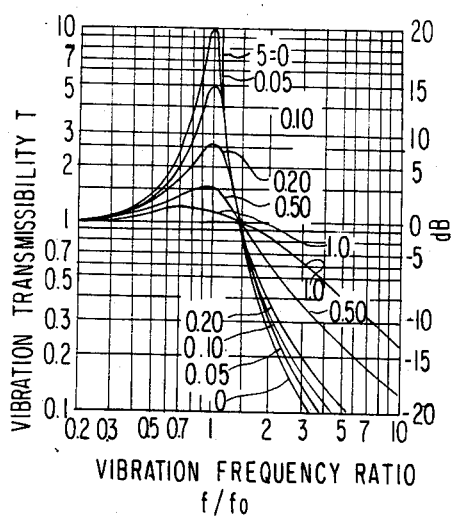
FIG. 1 is a drawing showing W/Wo dependence of vibration transmissibility.

$\omega$: frequency of external vibration
$\omega_0$: proper frequency of spring
$\epsilon$: damping coefficient of spring FIG. 1 shows $\omega/\omega_0$ ($=f/f_0$) dependence of vibration transmissibility T. T depends on a damping ratio $\eta(=2\epsilon/\omega_0)$ where $\omega/\omega_0$ is large and becomes small in accordance as the damping ratio is large. As will be apparent from the drawing, when the external vibration is of a constant frequency, proper frequency $\omega_0$ will be adjusted small and damping ratio $\eta$ large for making the vibration transmissibility T small. Proper frequency $\omega_0$ is given practically by the following expression according to elastic constant K and weight M of the rigid pedestal.

$$\omega_0 = \sqrt{\frac{K}{M}}$$

Namely, proper frequency can be kept small by increasing weight M of the rigid pedestal and decreasing elastic constant K, thereby minimizing vibration transmissibility and external vibration transmission. An oil damper or a vibration damping rubber are used to increase damping ratio.

However, since it is impossible to prevent vibrations completely from being transmitted, vibrations are transmitted more or less to the rigid pedestal. On the other hand, the rigid pedestal has many proper vibrations which are determined according to the shape and size. Therefore, when a frequency of the transmitted vibration coincides with one of proper vibrations of the rigid pedestal, the proper vibration is excited, and as will be understood from $\omega/\omega_0=1$ in FIG. 1, vibration transmissibility T becomes exceedingly high. To say nothing of the case where there is an impulsive wave or a plurality of vibration sources working, an ordinary vibration has a multitude of frequency components. Thus a conventional type of vibration damping bed can hardly remove vibration corresponding to the proper vibration of the rigid pedestal. Vibrations arising on a device like motor on the rigid pedestal which is accompanied by a mechanical operation cannot be removed likewise by the conventional vibration damping bed.

The invention will now be described for a vibration damping material (ferrite composite material).

Figure 2:
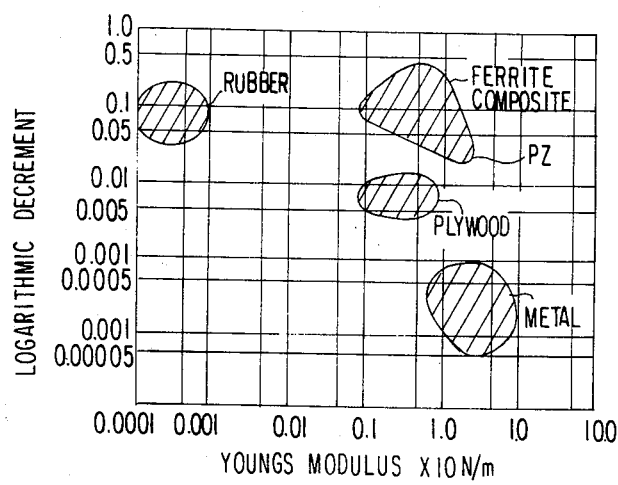
FIG. 2 is a drawing showing a correlation between logarithmic decrement and Young's modulus for various materials.

The vibration damping material using a ferrite composite material contains the feature that a rigidity of the material is high and a vibration damping function is also high. FIG. 2 compares the material with various existing materials for vibration damping function and rigidity, wherein the axis of ordinate indicates the so-called logarithmic decrement and the axis of abscissa indicates Young's modulus in logarithmic scale. The former gives a degree of the vibration damping function of the materials and the latter gives that of the rigidity. As will be apparent from the drawing, the existing materials are distributed roughly on the diagonal line running from left to right. This may refer to a property that the material with high vibration damping function is small in rigidity, and vice versa. In case, for example, vibrations on a heavyweight precision equipment will have to be damped, a material high in damping function like rubber is soft to cause shaking, while that of rigidity like steel is low in damping function. On the other hand, damping coefficient and rigidity of the vibration damping material available by ferrite composite material are distributed in zones pz with oblique lines of FIG. 2. As compared with the existing materials, the composite material according to the present invention is 0.04 to 0.5 in logarithmic decrement, which is $10^3$ times as high as metal and equivalent or over to plastics and rubber, and $10^8$ to $10^{10}$ N/m² by Young's modulus in rigidity, which is well compared with that of plywood and metal, thus indicating a very interesting characteristic with the two functions satisfied at the same time. Furthermore, the vibration damping material inherits straight an advantage of workability of resin which is used as base material. Namely, various processes such as pouring, molding and extrusion which are peculiar to resin treatment can be applied, and that with a complicated shape can thus be molded at high productivity. In addition, ferrite itself is stable chemically, which is protected further by resin, therefore it is superior in environment resistance and stable not only in alkali atmosphere but also in acid atmosphere.

Next the invention will be described for its preferred embodiments.

9 kg of polyester resin with viscosity about 1,000 cp was prepared. 30 g of methyl- ethyl keton par oxide as hardening substance and 30 g of cobalt octane acid as reaction enhancing substance were added to the polyester resin. Then, the resultant polyester resin was divided into three parts A, B and C each weighting 3 Kg. Then, 3 Kg, 7 Kg and 27 Kg of ferrite particles having averaged particle size of 1 to 4 μm were added to the parts A, B and C, respectively and sufficiently mixed in the respective parts. Then each part of the resultant composite was poured into a molding frame and then aged for three days. Thus, three samples A, B and C as the vibration damping materials of the invention were obtained from the resultant parts A, B and C, respectively, which have the following characteristics.

| Sample | Ferrite content | Density | Uniaxial compressive strength | Bending strength | Spontaneous magnetization | Logarithmic decrement at 50 Hz |
|---|---|---|---|---|---|---|
| A | 50% | 2.5 (g/cm$^2$) | 500~1,600 (kg/cm$^2$) | 350~400 (kg/cm$^2$) | 30 ($_e$mu/g) | 0.02 |
| B | 70% | 3.0 (g/cm$^2$) | | | 42 ($_e$mu/g) | 0.027 |
| C | 90% | 4.0 (g/cm$^2$) | | | 60 ($_e$mu/g) | 0.03 |

A high content of ferrite may increase density and vibration damping coefficient of the vibration damping material. However, when it comes to exceed 90%, the formability will be lost to impracticalness.

Figure 3:
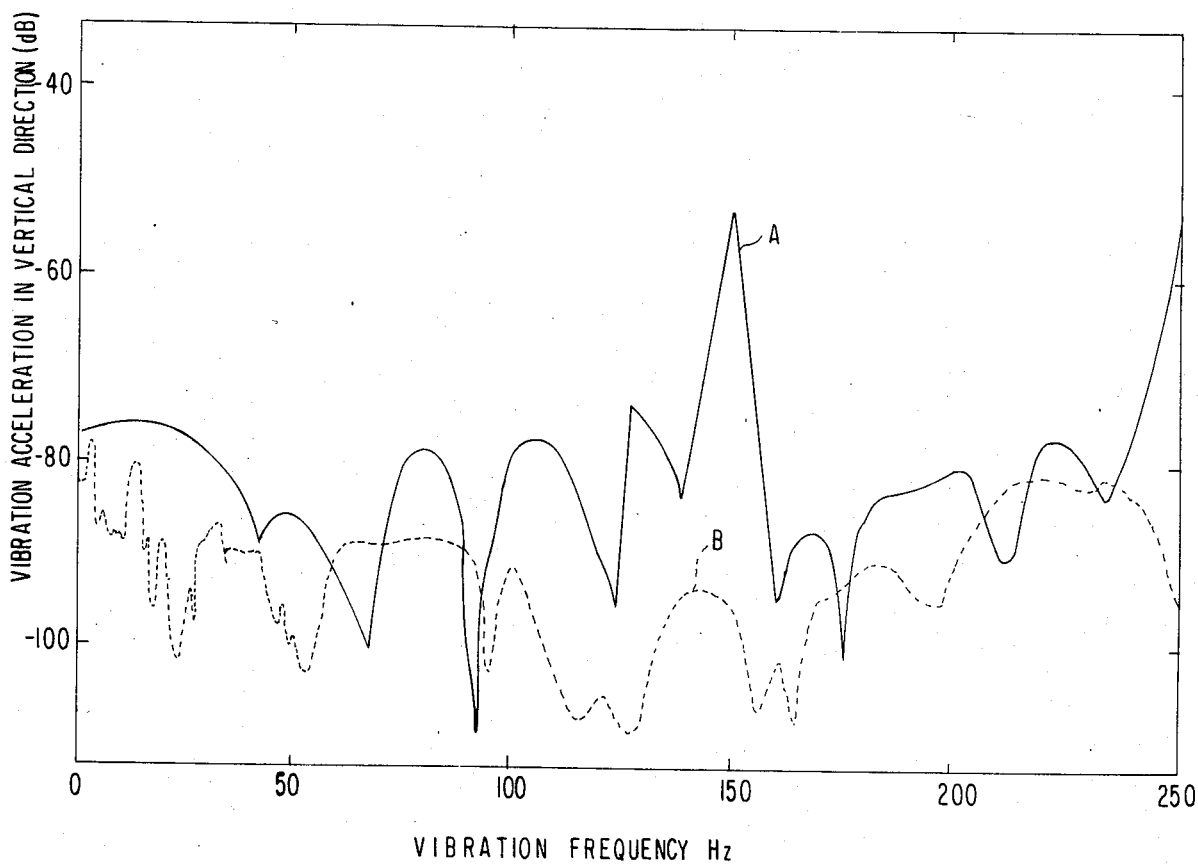
FIG. 3 is a drawing showing vibration acceleration characteristic of a vibration damping material according to the present invention and a conventional cast iron plate.

FIG. 3 shows a relation between vertical vibration acceleration (dB) and vibration frequency of the vibration damping material of 80 weight % of ferrite particles thus obtained which is formed into a plate vibration damping board 100 mm thick, 1,000 mm long and 700 mm wide under comparing with a rigid board 1,000 mm long and 700 mm wide which is obtained through putting a cast iron plate 19 mm thick on another cast iron plate 16 mm thick according to a conventional art.

In FIG. 3, a dotted line 32 indicates a characteristic of a vibration damping board according to the present invention, and a continuous line 31 indicates a vibration characteristic of a rigid board according to the conventional art.

As will be apparent from FIG. 3, a vertical vibration acceleration in each frequency of the characteristic 32 of the vibration damping board according to this invention is extremely minimized. A proper vibration around 150 Hz and 250 Hz of the characteristic 31 of the conventional board cannot be observed on the vibration damping bed of this invention, as is clear from the line 32.

Figure 4:
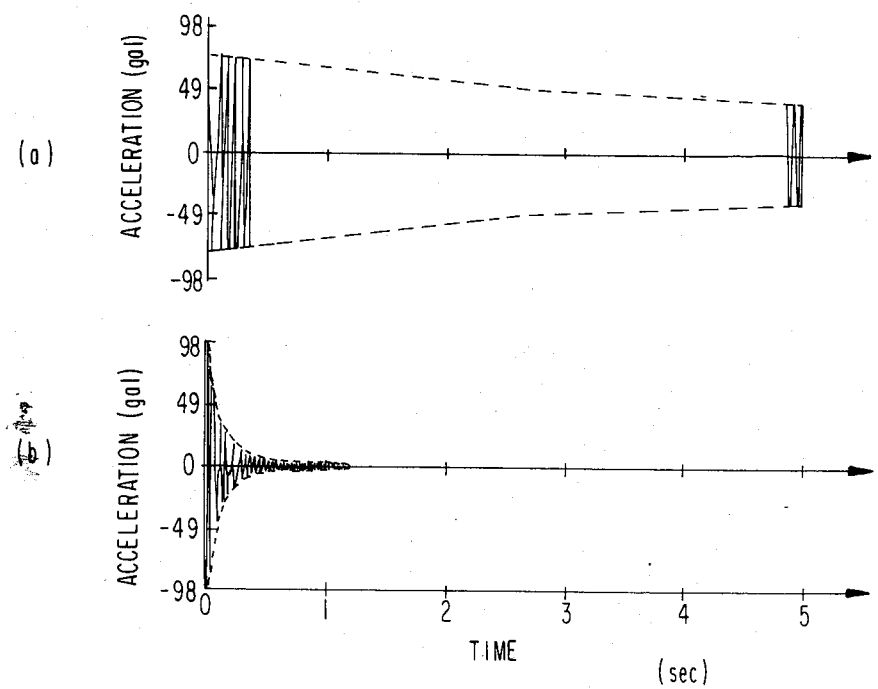
FIG. 4 is a drawing showing a relation between vibration acceleration and time for the vibration damping material according to the present invention and the conventional cast iron plate.

Vibration damping characteristics of a vibration damping board according to this embodiment and a vibration damping bed according to the conventional cast iron plate are shown in FIG. 4. A characteristic of the vibration damping board obtained according to this embodiment which is formed into a plate vibration damping board 600 mm long, 50 mm wide and 10 mm thick is given in FIG. 4 (B), and a characteristic of the vibration damping board according to a cast iron same in size and shape as the above is given in (A) thereof.

A composite material of this invention is ready for vibration damping as compared with cast iron, showing a logarithmic decrement about 40 to 100 times as high as cast iron.

Next, the invention will be described for the second embodiment with reference to FIG. 5 and FIG. 6.

Two kinds of ferrite particles 1 μm and 4 μm in average size are used in the same quantity each and finally mixed in polyester resin so as to have ferrite at 90% by weight and polyester resin at 10% by weight, which are hardened by means of a molding frame.

The vibration damping material is $150 \times 10^6$ N/m$^2$ in uniaxial compressive strength and $30 \times 10^6$ N/m$^2$ in bending strength to show a strength several times to ten times as high as cement concrete and is further $40 \times 10^9$ N/m$^2$ in Young's modulus to show a value equivalent to metal. A vibration damping coefficient is also given in size 10 to $10^2$ times high as compared with metal, coming at 0.04 to 0.06 or so. Density is 3 to 3.5 g/cm$^2$, which is almost equivalent to light metal.

Figure 5:
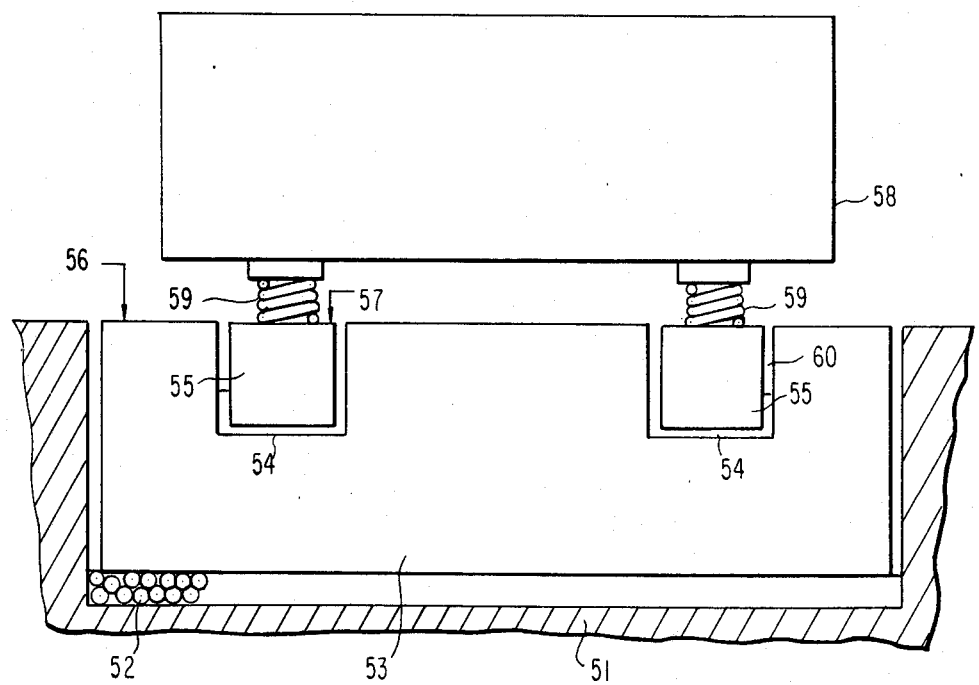
FIG. 5 is a drawing representing an example of biration damping structure according to the present invention.
Figure 6:
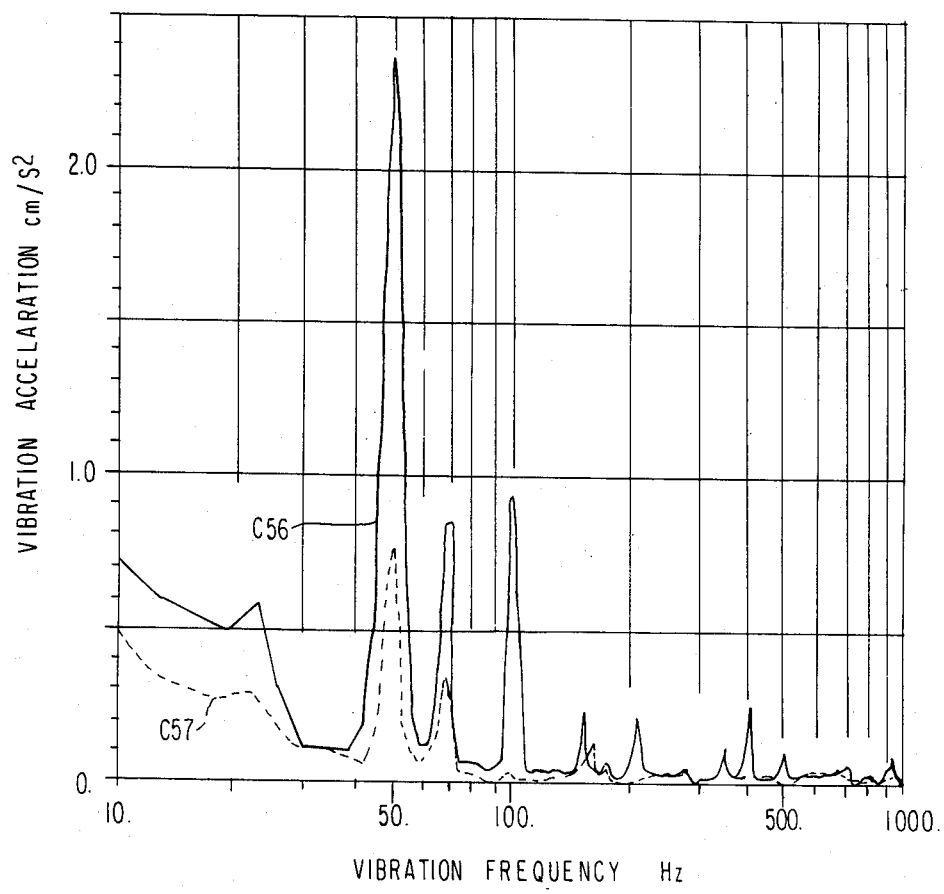
FIG. 6 is a drawing showing vibration acceleration characteristic in the embodiment given in FIG. 5.

The invention will further be described for a case wherein the vibration damping material is applied to a vibration-proof bed for a large-sized heavyweight equipment like large air-conditioning plant installed in a building basement with reference to FIG. 5. When such equipment is put in motion, the vibration is transmitted to the whole building from the floor to cause an infinitesimal vibration in most cases. It is well known that such vibration may not only cause a fatigue failure of the concrete itself but also exert an evil influence on precision machines installed, if any, in the building.

As illustrated in FIG. 5, a ballast 52 is laid uniformly on the bottom of a depression of the ground 51, and a concrete foundation 53 is placed thereon. The concrete foundation 53 is provided with a plurality of depressions 60. A vibration-proof bed 55 for which the above vibration damping material is formed cubically is inserted to installation in the depression 60 through mortar 54. An air conditioning unit body 58 is mounted on the top of four vibration-proof beds 55 through four springs 59. A vibration acceleration $C_{56}$ on the surface 56 of the foundation 53 and a vibration acceleration $C_{57}$ on the surface 57 of the vibration-proof bed 55 are shown in FIG. 6. It is understood that vibrations transmitted to the concrete foundation 53 from the unit body 58 through the vibration-proof beds 55 have decreased covering a wide frequency range.

The invention will then be described for other embodiment.

In the embodiment, the vibration damping material according to this invention has been attempted for lightweight structure with its characteristics kept alive.

While the lightweight structure is capable of making the bed follow infinitesimal vibrations of the floor, an influence of the vibrations on units installed on the bed can be minimized practically by a high vibration damping function of the material. Then, a natural vibration gets high from the density decreasing as keeping the rigidity, and a resonance with a low frequency at 50 Hz or below which is contributory as vibrations on the floor can practically be minimized.

For the lightweight structure, there working are various methods such as the method to use a resin light in density, the method to give a macroscopic structure by making a large cavity therein, and that of giving a microscopic structure.

However, since the resin is constituted chiefly of hydrocarbon, its density will not deviate largely from 1.0 g/cm$^3$, and thus the method is bounded accordingly for the lightweight structure to obtain.

In the method to give a macroscopic structure, a lightweight structure is obtainable thereby to a large extent, however, there may arise an unevenness in the product quality, and thus when it is used for a surface plate, for example, a vibration transmission characteristic from the floor will give an unevenness to the difference in structure or a mechanical strength will be deteriorated thereby to a subsidiary defect.

To improve the above-mentioned defect, this invention is to obtain an iron oxide-contained foamed solid molding superior in vibration damping function by employing the method to give a microscopic structure, i.e. a method to manufacture a combination with iron oxide by foaming the resin.

For the object of this embodiment, it is an essential point to blend fine particles of iron oxide with size of 1 to 100 um and keep them fluidized for the molding to manufacture.

Therefore, it is preferable that the resin component be liquid at ordinary temperature. Then, the iron oxide cannot be applied to a foamed phenol resin and a foamed urea resin for which an acid catalyst is utilized for its inhibiting hardening; and a heating foaming method is not suitable for the manufacture of a large-sized molding, therefore a cold hardenability is effective.

Further, an important characteristic for function of the vibration damping material includes dimensional accuracy and rigidity to say nothing of vibration absorptance.

It was found that a resin composition satisfactory to cope with the above characteristics was a foamed material obtainable through reaction with urethane.

A phenol resin polyol is preferable for use on the embodiment; since its viscosity characteristic can be selected arbitrarily, a fluidity can be ensured by mixing with iron oxide, and further a superiority in rigidity of the phenol resin polyol after foaming and hardening may satisfy various functions as a vibration damping material.

Then, iron oxide is not to inhibit hardening any in the reaction with polyisocyanate but has a catalytic action to induce a reactivity of isocyanate group, and hence it is to be surprised that a uniform reaction will come to an end at hardening.

Furthermore, polyisocyanate itself is low in viscosity and provided with a property suitable for blending iron oxide at ordinary temperature.

In the following embodiment, resol type phenol resin, benzyl ether type phenol resin, novolak type phenol resin and that for which these phenolic hydroxyl groups are denatured into alcoholic hydroxyl group are used individually or mixed for use as phenol resin polyol.

Further, an effect of this embodiment will not be deteriorated severely by denaturing with other polyol component with phenol resin polyol working as a principal component or by mixing them to use.

A solventless group will be used preferably on resin polyol, however, a solvent can be used at the same time to deteriorate viscosity.

Diisocyanates having isocyanate group at terminal are used for the component of polyisocyanate in this invention, and these are, for example, 4,4'-diphenylmethane diisocyanate, 2,4-toluen diisocyanate, paraphenylene diisocyanate and preferably 4,4'-diphenylmethane diisocyanate (M.D.I. normally).

For basis of blending polyol component with polyisocyanate, the ratio of hydroxyl group value which is a reaction group to isocyanate group can be selected arbitrarily, however, a preferable ratio will come in the range 0.5 to 2, which may be adjusted according to the hardening rate. There may be a case where foaming agent, foam control agent and hardening accelerator are used at the same time. For the foaming agent, halogenated hydrocarbons such as Fron-11, Fron-113, methylene chloride, 1,1,1-trichloroethane which are marketed generally as a low boiling point foaming agent, and aliphatic hydrocarbons such as hexane, propane, pentane and butane are used, and an addition rate is adjusted within 50% by weight to the resin according to the foaming multiplication factor.

Further, water is available to working as forming agent by, for example, generating carbonic acid gas through reaction with polyisocyanate.

For the foam control agent, nonionic surface active agents such as polyoxyethylenesorbitane fatty acid ester and castor oil-ethylene oxide adduct, alkyl phenols such as nonyl phenol and dodecyl phenol and polysiloxane, polyoxyalkylene copolymer are used, which are added to the resin group at 0.1 to 10% by weight.

A curing catalyst is not necessarily indispensable, however, tertiary amines, iron oxides of alkaline earth metal and organic weak acids are used individually or mixed at the same time for acceleration of hardening. The rate of blending will be preferable at 5% by weight or below to the resin component. The iron oxide used for this invention will be selected preferably from among those of particle size coming in 0.1 to 100 $\mu$m, but the composition is not particularly limited.

A blending composition of this embodiment is expressed by the ratio of iron oxide to a gross weight of resin and iron oxide, and the ratio at 40 to 70% is ready for blending.

When the weight composition ratio of iron oxide is 70% or over, a viscosity of the composition comes too high to mix uniformly, and thus uniform foaming and hardening become very hard.

When less than 40%, on the contrary, no improvement of the vibration damping function will be observed.

A manufacturing means to obtain a foamed hardened material of this embodiment is not particularly limited, however, a use of devices such as mixer and kneader is preferable for the purpose of obtaining uniform mixed compositions. In this case, however, a uniform mixing may exert an influence on the vibration damping property of the foamed solid, for which care should particularly be taken. The foamed material of this invention is preferable at a low density so far as the lightweight structure is nothing problematical to practical application, which generally comes in 1 to 0.05 g/cm$^3$ but preferably 0.8 to 0.1 g/cm$^3$.

Where the density is 1 g/cm$^3$ or over, a large-sized vibration samper becomes too heavy in gross weight to comply with the application of this invention; where density is less than 0.05 g/cm$^3$, the foam itself becomes weak in strength, which involves a problem of failure when a weight is placed on the vibration damper. The density of iron oxide becomes coarse, on the other hand, and a full damping function will no more be ensured.

A description will be given concretely below.

Phenol at 200 g and 47% formalin at 204 g are fed in a reactor, adjusted isothermally by adding lead naphthene at 1.4 g thereto, subjected to reaction for 4 hours at 100° to 103° C., and then unreacted phenol, condensed water, etc. are dehydrated and concentrated under decompression until they reach 130° C. in temperature, thus obtaining phenolic resin polyol. A foam control agent L-5420 (manufactured by Nippon Unica) is added at 1% by weight to the polyol. The resin thus obtained is 9,000 cp/20° C. in viscosity and 560 in OH value. Iron oxide particles 1 to 10 μm or so in size are mixed at 130 g in 45 g of 4,4-diphenylmethane diisocyanate uniformly with a 100 -mixer, then F-11 at 2 kg and triethanolamine at 0.5 g are added at a time to 30 g of phenolic resin polyol obtained as above, stirred at high speed for 60 seconds, and then fed to foaming in a mold 200×100×20 mm, thus obtaining a given form of lightweight vibration damper.

In this case, however, a stainless steel plate is used for top and bottom, and a pressure capable of withstnanding the foaming pressure is kept by press. The lightweight vibration damper thus obtained is 0.54 g/cm$^3$ in density. From the above material, a vibration damping characteristic −20 to −40 dB is obtained against vibrations 100 to 500 Hz.

Figure 7:
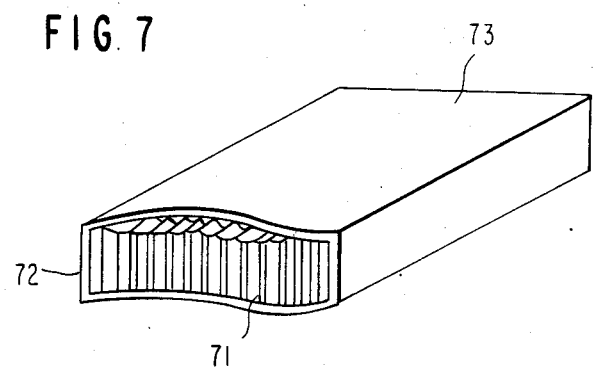
FIG. 7 to FIG. 11 are drawings representing each embodiment of the present invention.

Further embodiment of this invention will be described with reference to FIG. 7.

For a composite material used for this embodiment, about 70 to 90% by weight of iron oxide powders 1 u in particle size were mixed with about 30 to 10% by weight of resin, poured in a frame to molding, thus obtaining plates 72 and 73 having a thickness of 10 mm. The plates 72 and 73 are sticked on top, bottom and sides of a honeycomb structure 71 of aluminum or the like with adhesive, thereby obtaining a vibration-proof bed.

According to this embodiment, a rigid board obtained through sticking an iron oxide-resin plate high in vibration damping coefficient is used on a part or all of the surface of the honeycomb structure which is high in rigidity and lightweight, therefore a natural vibration of the rigid board can be minimized, vibrations transmitted to a measuring system can be decreased according to the vibration damping characteristic of the iron oxide-resin in case a device accompanying a mechanical vibration like motor is installed on a surface plate, and since a strength against bending is increased by employing the honeycomb structure, the iron oxide-resin plate can be thinned in thickness, and the surface plate can be made lightweight, thus preparing a rigid board for the vibration-proof bed superior in vibration damping characteristic and easy to handle.

Next, an example of the vibration-proof bed according to this invention will be described with reference to FIG. 8.

This embodiment comprises making a pedestal stand still as swiftly as possible by suppressing repulsion of a shock absorber through magnetic suction force when a vertical vibration occurs thereon.

Figure 8:
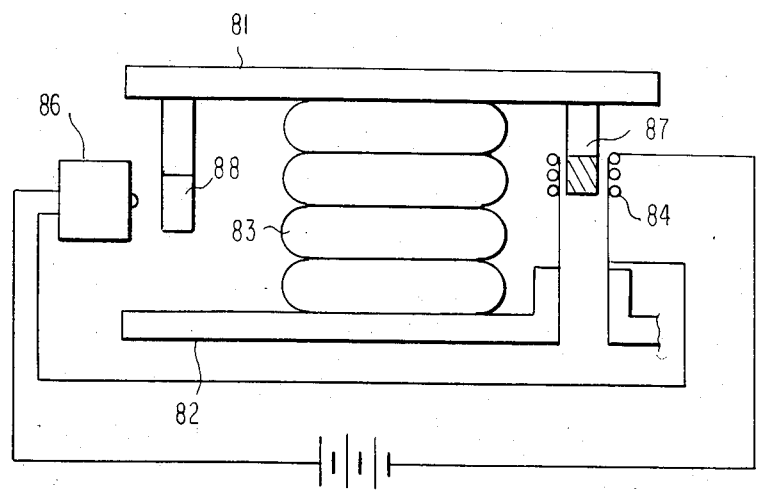

In FIG. 8, a pedestal 81 to mount equipment thereon is supported on an air spring 83 installed on a base 82. The pedestal 81 is formed with a ferrite-resin composite material according to the present invention. The drawing represents one embodiment of support arrangement, and practically the pedestal 81 is supported horizontally at several spots on the corners by the air spring 83 provided on the base 82. There may be a case where a vibration damping spring or other shock absorber is employed other than the air spring. A coil 84 is fixed on the base 82, a power source 85 and a proximity switch 86 are connected to a wiring of the coil 84, an iron piece 87 and a sensor 88 of the proximity switch 86 are mounted on a side of the pedestal 81, the iron piece 87 is inserted in the coil 84, and the sensor 88 is disposed to cross a front of the proximity switch 86. The sensor 88 is present on the front of the proximity switch 86 and a current is not carried to the coil 84 normally. When the pedestal 81 is depressed to push the air spring downward, the sensor 88 also descends to leave the proximity switch 86. A contact incorporated in the switch then closes, and the coil 84 is conducted to excitation. A suction force works on the iron piece 87 according to the excitation of the coil 84, thereby holding the iron piece 87. Then the air spring 83 is about to recoil instantly on a blast coming into the air spring 83, however, the repulsion is checked by a magnetic suction force of the coil 84 which works on the iron piece 87, a vibration energy is quickly damped, and thus the pedestal 81 comes gently to stand still.

The above embodiment has described a case where a magnetic suction force is generated on the coil by a vertical move of the pedestal 81, however, a reverse magnetic force generated on the coil by operating a magnet in the coil can also be utilized.

Figure 9:
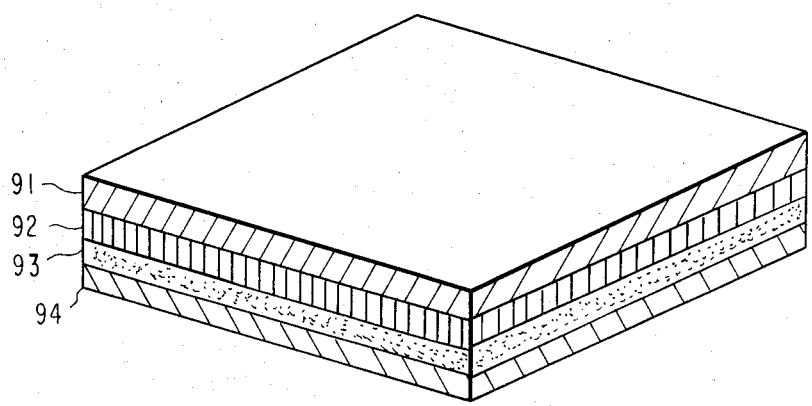

Next, the invention will further be described for other embodiment with reference to FIG. 9.

This embodiment relates to a vibration damping board in multi-layer construction. The vibration damping material in multi-layer construction comprises four layers 91 to 94 6 mm thick each. The first layer 94 consists of a neoprene rubber and: the second layer 93 consists of a neoprene rubber containing 30% by weight of ferrite. The third layer 92 consists of a neoprene rubber containing 60% by weight of ferrite and the fourth layer 91 consists of a neoprene rubber containing 90% by weight of ferrite. A composite material for which ferrite particles are mixed with rubber or plastics at 40 to 90 weight % can be made to have a big elastic modulus by increasing the ferrite content. Further a vibration damping coefficient is not capable of decreasing thereby, therefore it is taken best for fabricating the vibration damping material in multi-layer construction according to this embodiment. The neoprene rubber containing 90% by weight of ferrite for the fourth layer 91 has a big elastic modulus and hence capable of maintaining a rigidity of the whole vibration damping material in multi-layer construction. Against a comparatively small impact vibration, the first layer 94 or the first layer 94 and the second layer 93 will come near to an elastic limit and work as an impact vibration energy abosrbing material according to hysteresis; against a big impact vibration, the first layer 94, the second layer 93, the third layer 92 and the fourth layer 91 will come near to the elastic limit and work as an impact vibration energy absorbing material according to hysteresis, thus showing a vibration damping effect. It goes without saying that the vibration damping effect due to normal viscous resistance is borne by all the layers 94 to 91. An equipment is placed and disposed on the fourth layer 91.

Figure 10A:
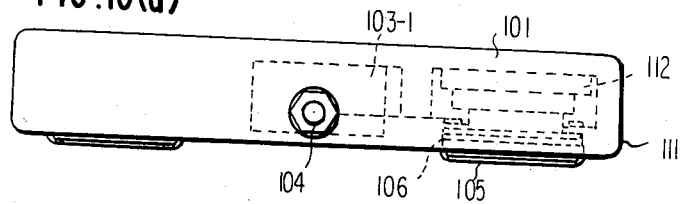
Figure 10B:
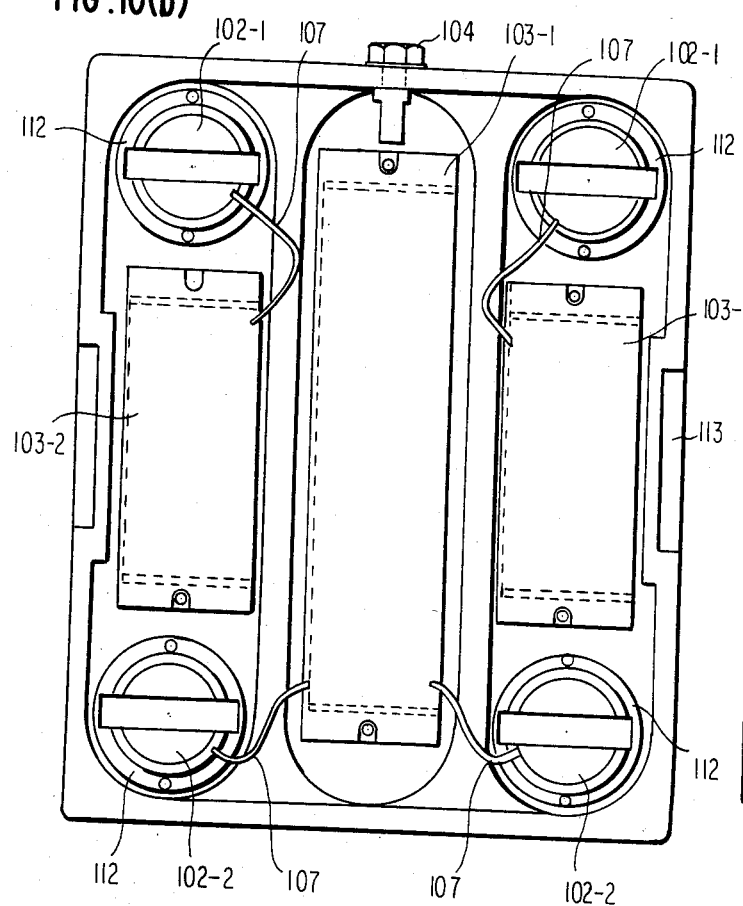
Figure 10C:
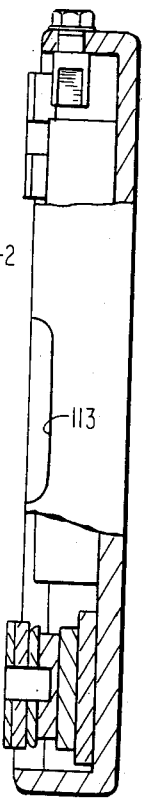

Next, a vibration-proof bed employing the vibration damping material according to this invention will be described with reference to FIG. 10.

A mounting plate 111 unified by fitting auxiliary tanks 103-1, 103-2 containing high-pressure air and an air feed port 104 on an enclosure 101 into which the iron oxide-resin composit material is molded is supported by four air springs 102-1, 102-2 through an air spring fixture 12. The mounting plate 111 is provided with a concavity 113 which works as a handle to facilitate a transport of the vibration-proof bed. The air spring 102 elongates when the vibration-proof bed is held up by the concavity 113, however, a stopper 106 mounted on an air spring bed 105 works, in this case, to prevent the air spring 102 from elongating extremely. Namely, an air spring support is not necessary. The two springs 102-1 are connected to the two auxiliary tanks 102-2 through a pipe 107. The remaining two springs 102-2 are connected to the common auxiliary tank 103-1, and thus the same pressure is applied at all times. A piping from the air feed port 104 to each auxiliary tank is omitted.

An example in which the vibration damping material according to this invention is applied on an audio equipment will be described with reference to FIG. 11 and FIG. 12.

A driving unit of the audio equipment such as speaker enclosure, player board and tape deck resonates according to an external sound or vibration, sounds itself or vibrates. A reproduced sound with good tonal quality is not obtainable consequently in most cases. To prevent the harmful sound and vibration, it is important to suppress vibrations by increasing weight and rigidity as well. Therefore, density, rigidity and vibration damping will be required much for the working material.

In the case of wood prevailing for good tonal quality hitherto, density is 1 or below, logarithmic decrement representing a vibration damping effect is 0.005 or so, and for the improvement of tonal quality, a thick material is used, weight and rigidity are increased essentially, and further a reinforcing material is applied. It is therefore unavoidable that both manufacturing process and cost will increase.

Where aluminum is used, density is 2.7 and rigidity is satisfactory, however, the logarithmic decrement is only 0.00005 or so. Both manufacturing cost and material cost are high, too.

Then, in the case of synthetic resin material comparatively simple in manufacturing process and ready for mass production, it is used as FRP for which glass fiber is mixed to increase rigidity, however, density is small at 1.6 or so. A thick material must be used to increase weight and rigidity, which may involve a high costing.

As for the vibration damping material according to this invention, density and rigidity required for the vibration damper to work for audio equipment are satisfactorily large, a requirement for a particularly large vibration damping coefficient which has not been taken up so seriously is satisfied, and further it is ready for mass production cheaply and essentially as well through monobloc molding.

Figure 11:
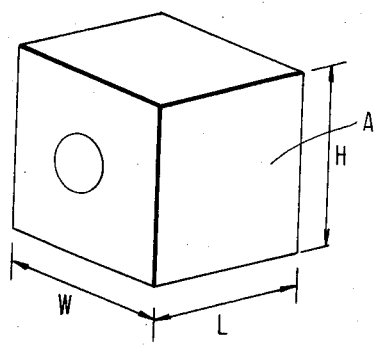

FIG. 11 shows a speaker enclosure which is obtained through mixing 75% by weight of ferrite powders 1 to 10 um in grain size with ABS resin to monobloc molding. The enclosure is 30 cm wide, 35 cm long, 50 cm high and 1 cm in wall thickness. The ferrite composite material according to this invention is 2.0 to 3.5 in density, $1.5 \times 10^{10}$ N/m$^2$ in rigidity by Young's modulus and about 0.04 in logarithmic decrement, which is about 100 times or over as high as aluminum, therefore the vibration damping effect is exceedingly high. Furthermore, since it is ready essentially for monobloc molding, an elastic looseness arising on a junction can be avoided. Productivity is high and cost is cheap, in addition. A vibration damping performance of the material itself is also high, therefore vibrations can be suppressed extremely low to an improvement of tonal quality.

Figure 12:
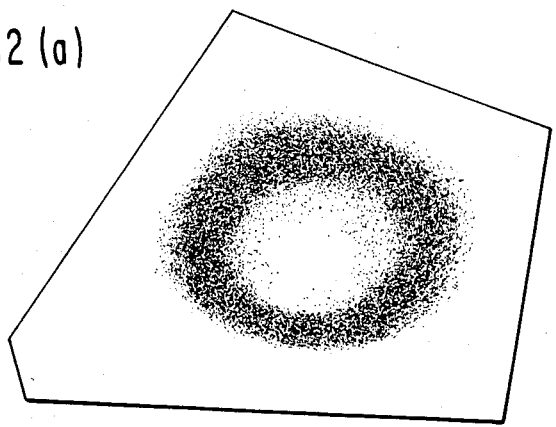
FIG. 12 is a drawing showing vibrating state of a speaker enclosure given in embodiment in FIG. 11 and a conventional enclosure.
Figure 12:
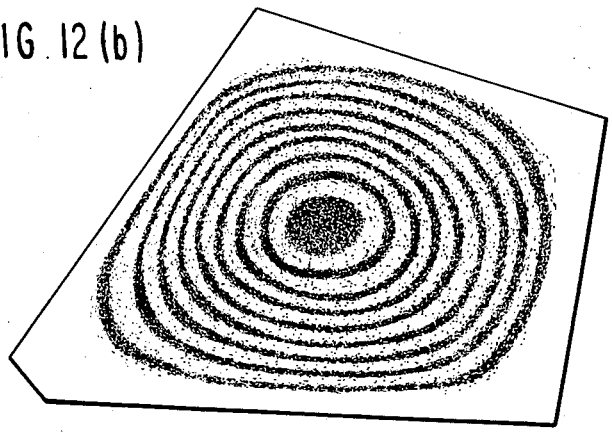

FIG. 12 represents the case where a vibration amplitude arising on a side A of the speaker enclosure when the side is excited with a natural frequency is observed on laser holography process. FIG. 12 (A) represents a case according to the embodiment of FIG. 11, and FIG. 12 (B) represents a case of conventional enclosure formed with plate. One stripe indicates a contour line of the amplitude. It is understood that FIG. 12 (A) shows the enclosure which is kept to about 1/10 amplitude as compared with the case of (B).

From the result above, the speaker enclosure made of ferrite composite material according to this invention is small both in vibration amplitude by natural frequency and transfer function.

We claim:

1. A system for isolating vibrations, comprising a functional apparatus to be operated where vibration is damped, and a bed on which said functional apparatus is mounted, said bed made by usage of a composition essentially consisting of 40 to 90 weight percent of iron oxide particles of 0.1 to 100 μm in size and 60 to 10 weight percent of resin, in which said bed includes honeycomb core made of metal.

2. The system according to claim 1, in which said functional apparatus is mounted on said bed via spring means.

3. A method of isolating a functional appratus from vibration, said method comprising the step of disposing said functional apparatus on a bed comprising 40 to 90 weight percent of iron oxide particles of 0.1 to 100 μm in size and 60 to 10 weight percent of resin, in which a plurality of foams are distributed in said bed.

4. A method of isolating a functional apparatus from vibration, said method comprising the step of disposing said functional apparatus on a bed comprising 40 to 90 weight percent of iron oxide particles of 0.1 to 100 μm in size and 60 to 10 weight percent of resin, wherein said bed comprises a honeycomb core made of metal.

5. A vibration damping material consisting essentially of 40 to 90 weight percent of ferrite particles of 0.1 to 100 μm in size and 60 to 10 weight percent of resin, said material having a logarithmic decrement of 0.04 to 0.5.

6. The material according to claim 5, in which said resin is selected from the group of polyester, polypropylene, urethane, phenol resin, epoxy resin, ABS resin and rubber.

7. A method of damping vibration in an apparatus by disposing between said apparatus and a source of vibration a vibration damping material, said method comprising the step of disposing between said vibration source and said apparatus a vibration damping material comprising 40 to 90 weight percent of ferrite particles of 0.1 to 100 microns in size and 60 to 10 weight percent of resin, said material having a logarithmic decrement of 0.04 to 0.5.

8. A method as defined in claim 7, wherein said resin is selected from the group of polyester, polypropylene, urethane, phenol resin, epoxy resin, and ABS resin.

9. A method of isolating a functional apparatus from vibration, said method comprising the step of disposing said functional apparatus on a bed comprising 40 to 90 weight percent offerrite particles of 0.1 to 100 μm in size and 60 to 10 weight percent of resin.

10. A method as defined in claim 9, wherein said step of disposing said functional apparatus on said bed comprises mounting said functional apparatus on said bed via spring means.

11. A method as defined in claim 9, further comprising the step of distributing a plurality of foams in said bed.

12. A method as defined in claim 9, wherein said bed comprises a honeycomb core made of metal.

* * * * *